Nov. 11, 1930.    J. O. CARREY    1,781,161
ADJUSTABLE MOUNTING
Filed April 16, 1926
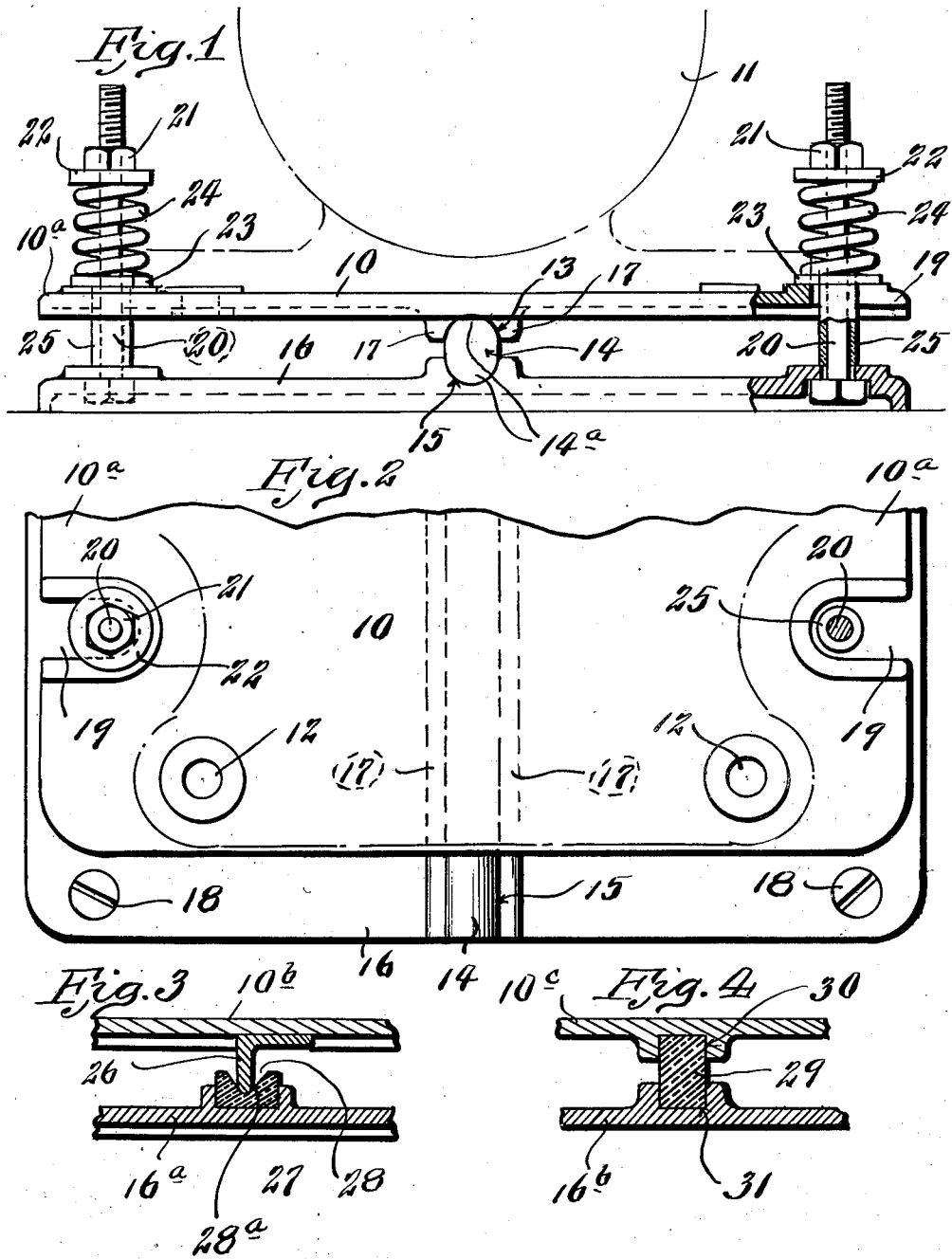
Inventor
John O. Carrey
By Cornwall, Bedell & Janues
Attys.

Patented Nov. 11, 1930

1,781,161

UNITED STATES PATENT OFFICE

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI

ADJUSTABLE MOUNTING

Application filed April 16, 1926. Serial No. 102,494.

This invention relates to new and useful improvements in flexible mountings or supports for motors and the like, the objects of the invention being to provide a mounting adapted to have secured thereto a motor or similar apparatus and having a single line of supporting contact with the base, said line of contact being preferably formed by a resilient member which prevents the transmission of the vibration and noises, incidental to the operation of the apparatus supported by the mounting, to the base or other stationary part supporting said mounting.

Other objects of the invention are to provide a mounting having yielding points of engagement between the stationary or rigid base and the mounting or plate receiving the motor, said attaching or interengaging means being adjustable to regulate the tension applied to said plate and permit tilting thereof with the resilient member as the axis.

Further objects of the invention are to provide a simple form of mounting wherein the direct contact between the base and the plate carrying the motor or other apparatus is eliminated and a resilient support is interposed to absorb vibration, and yielding anchoring connections are provided for the plate to hold the latter in proper engagement with said resilient member.

With these and other objects in view my invention consists in certain novel features of construction and arrangement of parts, hereinafter more fully described and claimed, and illustrated in the accompanying drawings, in which—

Figure 1 is a side elevational view of the mounting showing the motor in dotted lines.

Figure 2 is a top plan view of the mounting, partly broken away.

Figure 3 is a transverse cross section of a modified form of supporting connection between the plate and the stationary base.

Figure 4 is a transverse detail cross section showing still another modified form.

Referring by numerals to the accompanying drawings, 10 indicates a plate which is adapted to receive a motor or similar device 11. Plate 10 is provided with apertures 12 for receiving suitable fastening devices for attaching the motor in position thereon.

The underside of plate 10 is provided with a transversely disposed downwardly presented seat 13 for receiving the upper edge of a strip 14 of resilient material, such as rubber. The lower edge of this strip is seated in a seat 15 formed in a stationary base 16. Seat 13, which is formed by providing two parallel ribs 17, is disposed preferably equidistant from the ends 10$^a$ of plate 10 but may be arranged at any point intermediate its ends. Member 14 is of any desired thickness and the edges thereof are preferably convex in cross section as indicated at 14$^a$ to fit in the concave seats 13 and 15. Base 16 is anchored in position by suitable fastening devices 18.

In order to maintain plate 10 in proper position and prevent the displacement thereof with respect to member 14 each end 10$^a$ is formed with an open-ended slot 19 through which extends upwardly a bolt 20, the head thereof being located in the base 16. The end of each bolt 20 is threaded and receives a nut 21 which bears against the washer 22. A washer 23 is loosely placed on each bolt 20 and bears against the corresponding slotted end 10$^a$.

A coiled spring 24 is interposed between each pair of washers 22 and 23 and exerts its influence against the respective end 10$^a$, thereby maintaining plate 10 under spring pressure in engagement with resilient member 14. The tension of springs 24 is regulated by turning nuts 21 in proper directions and the tension of said springs can be adjusted independently of each other whereby said mounting may be used as a belt tightener when employed in conjunction with the motor operating a belt drive.

A sleeve 25 of rubber or other suitable insulating or resilient material is slipped over the shank of each bolt 20 and prevents contact between plate 10 and said bolts 20. Washers 23 may also be formed of insulating material such as hard rubber or fiber, thus completing the electrical insulation of motor 11 and plate 10 from base 16.

The vibration and other noises produced by the operation of the motor are absorbed by the resilient member 14 and springs 24 and are thus prevented from being transmitted to the rigid base 16 or other stationary support. Furthermore, the tension of springs 24 holds plate 10 under pressure to prevent excessive vibration of said plate and at the same time form a yielding connection between said plate and the rigid base.

In the modified form shown in Figure 3, mounting plate 10$^b$ is provided with a downwardly presented rib 26 preferably formed by securing an angle iron 27 to the underside of said plate 10$^b$. Base 16$^a$ has arranged thereon a resilient member 27 provided with a V-shaped groove 28 which forms a seat for receiving rib 26. The edge of rib 26 is preferably rounded as indicated at 26$^a$ to fit in the concave seat 28$^a$ of groove 28.

In the form shown in Figure 4, a resilient member 29 is formed rectangular in cross section, and plates 10$^c$ and base 16$^b$ are provided with channel-shaped seats 30 and 31, respectively, presented toward each other for receiving the edges of member 29. In this manner, a certain amount of tilting movement of plate or mounting 10 is permitted to allow proper adjustment of said plate and the apparatus supported thereon and at the same time the resiliency of the member interposed between the plate and the base serves to prevent transmission of vibration from said plate to the base.

I claim:

1. A mounting for refrigerating apparatus comprising in combination a base, a strip of rubber arranged transversely thereon and extending upwardly therefrom, a rigid mounting plate resting intermediate its ends on said strip and pivotally supported thereby, devices extending from said base for interengagement with said plate, and coil springs interposed between said plate and said devices for maintaining said plate in yielding engagement with said strip and permitting adjusting tilting movement of said plate.

2. A mounting for refrigerating apparatus comprising in combination a stationary base, a strip of resilient material arranged transversely thereon and extending upwardly therefrom, a rigid supporting plate arranged above said base, means on the underside of said plate and extending downwardly and engaging the upper edge of said strip and forming a pivotal mount for said supporting plate, bolts seated in said base and extending upwardly through the openings formed in the ends of said plate, washers adjustably mounted on the threaded ends of said bolts, and coil springs interposed between said washers and bearing on top of said plate for yieldingly holding the latter against said strip and in proper operative position.

3. A mounting for refrigerating apparatus comprising in combination a support, a rigid supporting plate arranged thereabove, a strip of rubber arranged on said support tansversely of said plate and extending upwardly from said support, means on the underside of said plate for engaging the upper face of said strip whereby said plate is fulcrumed intermediate its ends on said strip, and tensioning means stationarily mounted in said support and arranged to each side of said strip and engaging said plate whereby the latter is yieldingly held in balanced position on said strip.

4. A mounting of the class described comprising in combination a support having an upwardly presented transversely disposed pocket, a strip of rubber arranged in said pocket, a rigid supporting plate arranged above said support in spaced-apart relation therewith, means disposed transversely on the underside of said plate for engaging the upper face of said strip whereby the latter carries said plate, a pair of bolts seated in said support and extending upwardly therefrom and through suitable apertures formed in said plate, a spring arranged on each bolt and having its lower end bearing against said plate, and means screw-seated on the upper threaded end of said bolt and engaging the upper end of said spring for regulating the tension thereof and maintaining said plate in adjusted position.

5. In a device of the class described, the combination of a support having an upwardly presented transversely disposed pocket, a strip of rubber arranged therein and extending upwardly therefrom, a rigid plate arranged above said support in spaced relation therewith, means disposed transversely on the underside of said plate and engaging said strip of rubber whereby said plate is fulcrumed intermediate its ends on said strip, bolts seated in said base and extending upwardly through openings formed in the ends of said plate, coiled springs arranged on said bolts and having lower ends bearing against said plate, and means screw-seated on the upper threaded ends of said bolts and engaging the upper ends of said springs for yieldingly holding said plate in adjusted operative position.

In testimony whereof I hereunto affix my signature this 14th day of April, 1926.

JOHN O. CARREY.